United States Patent [19]

Kato

[11] Patent Number: 4,748,636
[45] Date of Patent: May 31, 1988

[54] METHOD AND APPARATUS OF TRANSMITTING IMAGE DATA IN A SATELLITE SYSTEM

[75] Inventor: Hironori Kato, Tokyo, Japan

[73] Assignee: NEC Corporation, Japan

[21] Appl. No.: 40,884

[22] Filed: Apr. 21, 1987

[30] Foreign Application Priority Data

Apr. 28, 1986 [JP] Japan .................................. 61-99253
May 14, 1986 [JP] Japan ................................ 61-110251

[51] Int. Cl.⁴ .......................................... H04L 27/30
[52] U.S. Cl. ...................................................... 375/1
[58] Field of Search ..................... 375/1; 364/521, 522; 371/30

[56] References Cited

U.S. PATENT DOCUMENTS 4,392,231 7/1983 Henry ..................................... 375/1
4,701,934 10/1987 Jasper ...................................... 375/1

OTHER PUBLICATIONS

"Geostationary Meteorological Satellite System in Japan" by Masanori Homma, Moriyoshi Minowa, Mitsuo Kobayashi and Minoru Harada, pp. 570-588.

Primary Examiner—Salvatore Cangialosi
Attorney, Agent, or Firm—Laff, Whitesel, Conte & Saret

[57] ABSTRACT

An improved method and apparatus of transmitting image data in a satellite system comprises a satellite from which image data signals of a decreased data rate and of a spread spectrum which are to be processed and processed image data signals which are received from a ground center station are transmitted simultaneously. The processed image data signals are also encoded with error correction code so that the image data signals to be processed and the processed image data signals can be separated in one of ground image data collecting stations even if the both signals are transmitted from the satellite to the ground with carrier frequencies adjacent to each other or the same carrier frequency. In addition, a receiving antenna can be smaller on the ground in accordance with an encoded gain.

6 Claims, 6 Drawing Sheets

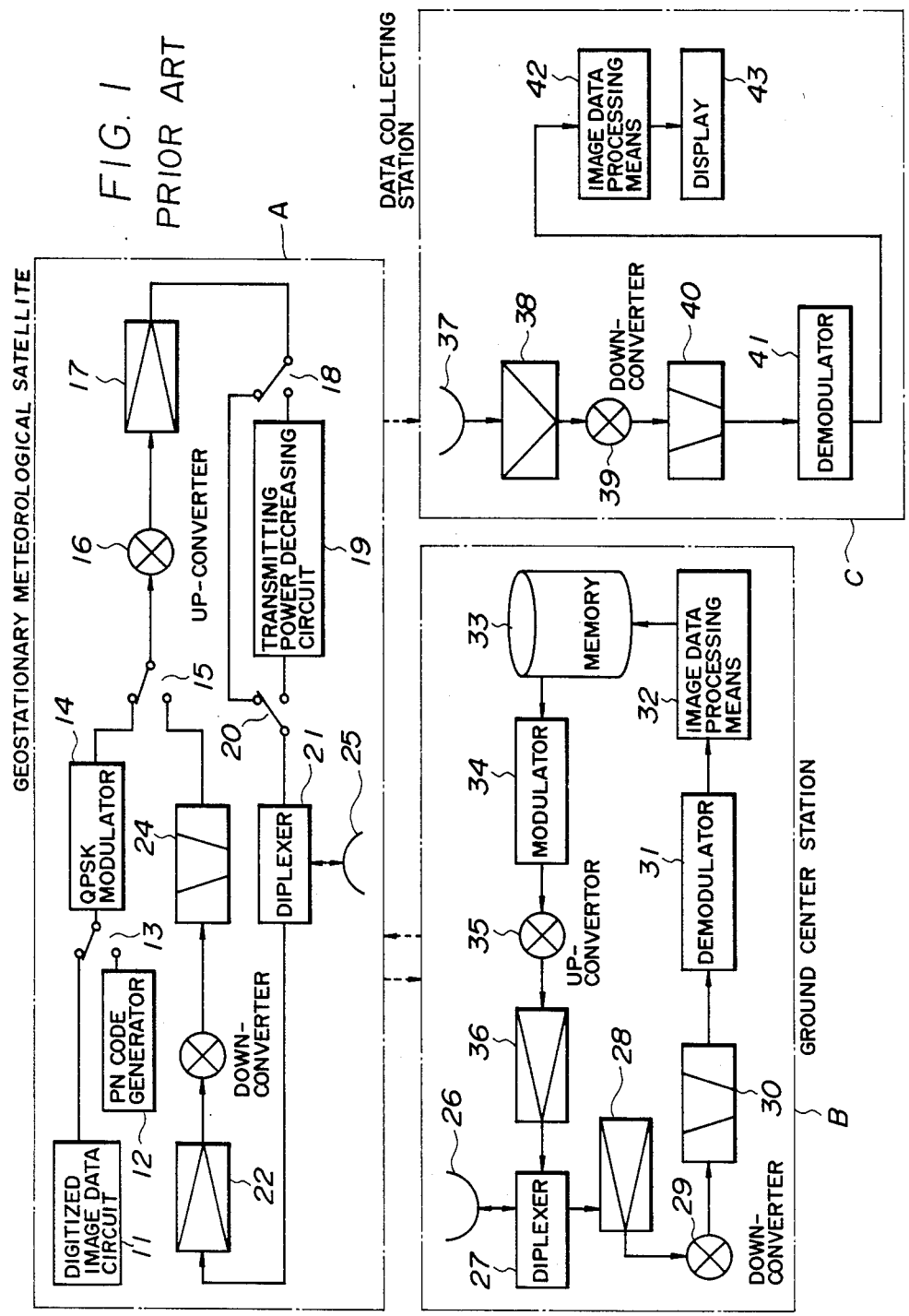

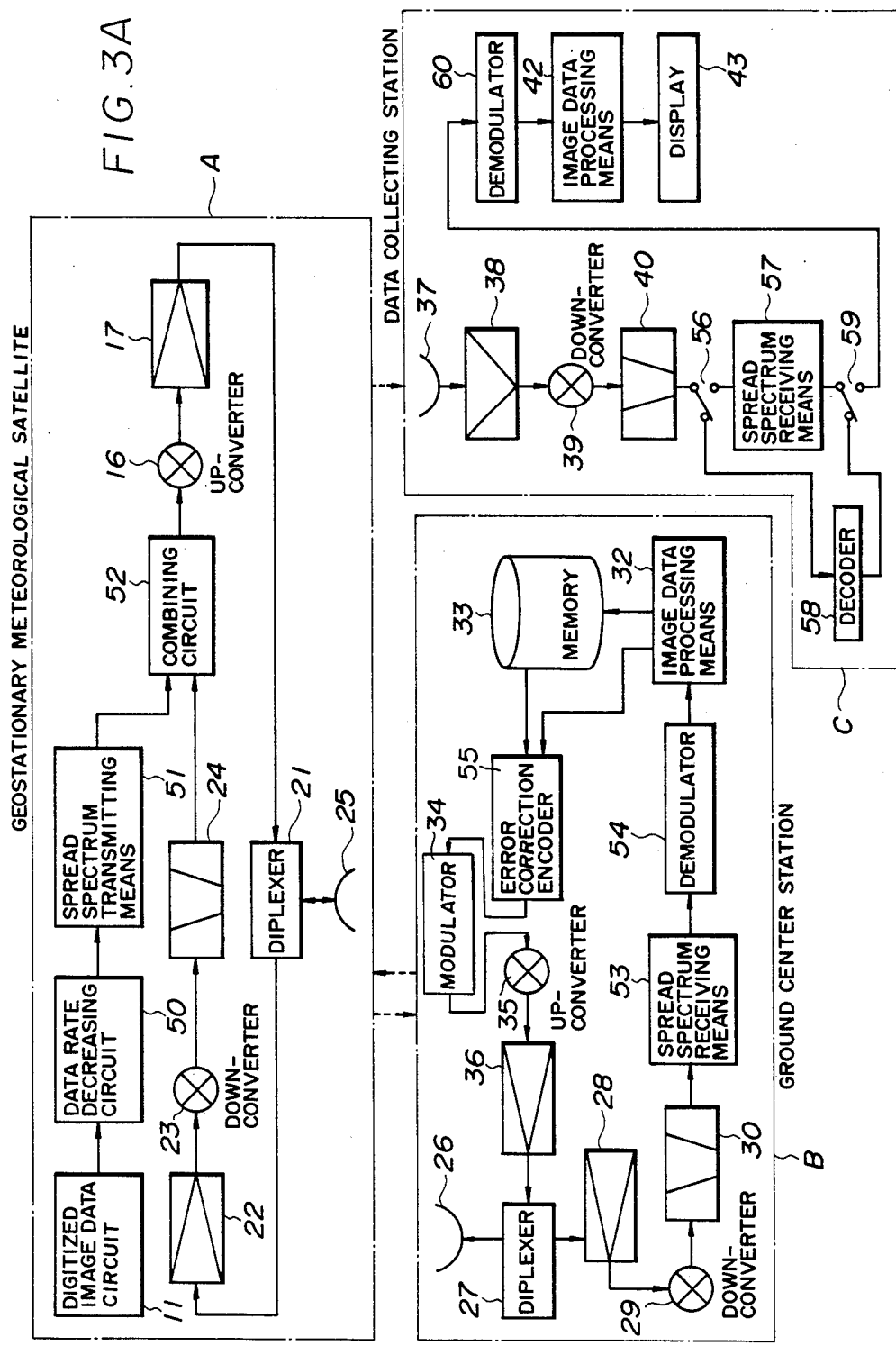

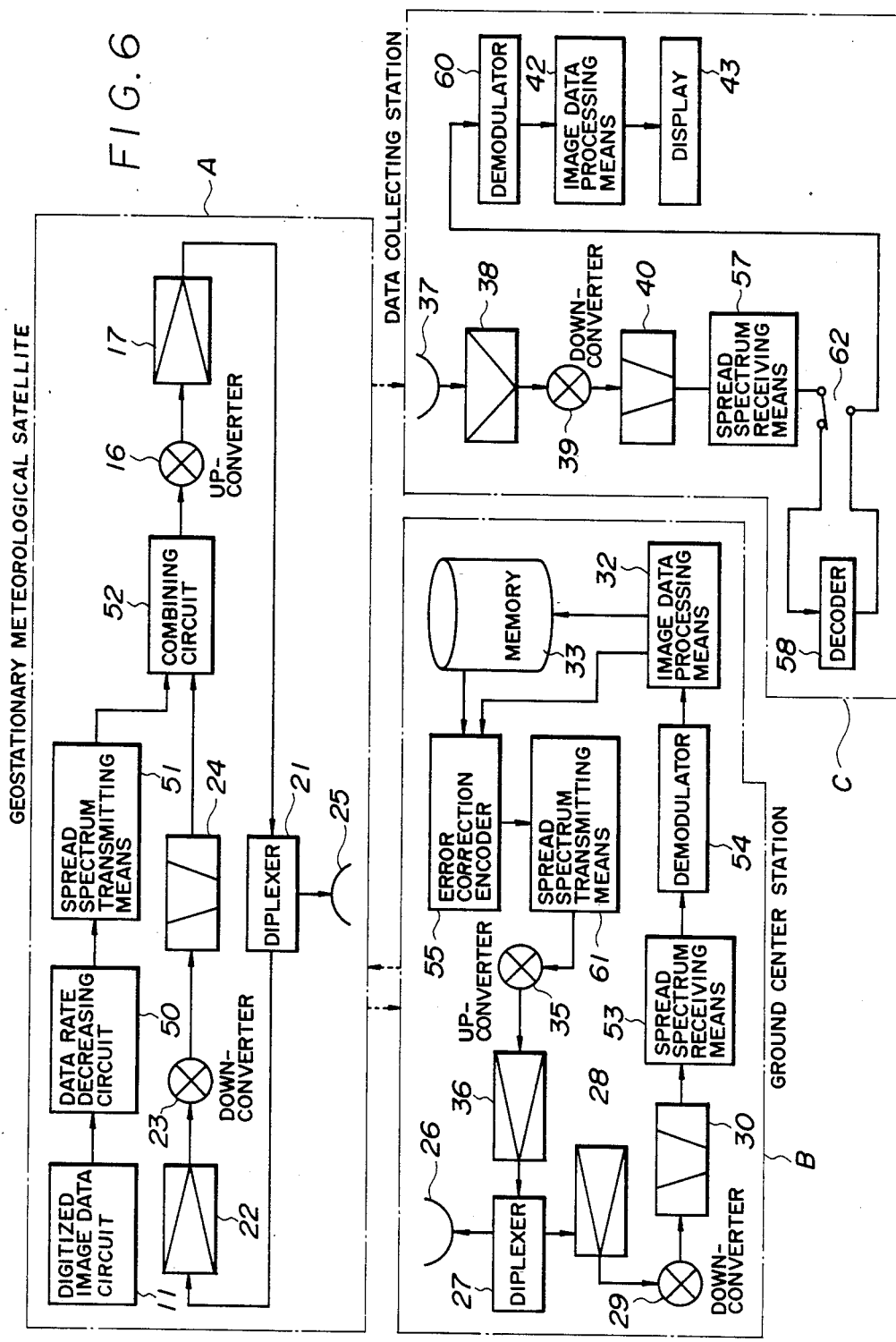

METHOD AND APPARATUS OF TRANSMITTING IMAGE DATA IN A SATELLITE SYSTEM

FIELD OF THE INVENTION

The invention relates to a method and apparatus of transmitting image data in a satellite system, and more particularly to a method and apparatus of transmitting image data in a satellite system in which image data to be processed and processed image data can be transmitted simultaneously.

BACKGROUND OF THE INVENTION

One of geostationary meteorological satellite systems has been described in "Progress in Astronautics and Aeronautics, vol. 97-Monitoring earth's ocean, land, and atmospheric from space/sensors, systems, and applications" published in 1985 by AIAA. In such a geostationary meteorological satellite system, there is practically adopted an apparatus of transmitting image data between a satellite and a ground center station, and from the satellite to ground data collecting stations including aircraft and ship. The satellite comprises a QPSK (Quadrature Phase Shift Keying) modulator of modulating digital image data signals obtained by observations of the satellite and random signals produced in a PN (Pseudo Noise) code generator, an up-converter of converting frequency of signals modulated in the modulator into a radio frequency, and an antenna by which the modulated signals of the radio frequency of signals modulated in the modulator into a radio frequency are radiated and by which image data signals processed in the ground center station are received. The ground center station comprises an antenna by which the modulated signals are received from the satellite and by which the processed image data signals are radiated, a down-converter of converting the radio frequency of the modulated signals into an original frequency thereof, a demodulator of demodulating the modulated signals to output analog image data signals, an image data processing means of processing the analog image data signals to produce the aforementioned processed image data signal after being digitized, a memory of temporalily storing the processed image data signals, a modulator of modulating the carrier wave with the processed image data signals read out of the memory, and an up-converter of converting frequency of the processed image data signals into a radio frequency. In addition, each of the ground data collecting stations comprises an antenna by which the processed image data signals are received, a down-converter of converting the radio frequency of the processed image data signals into the original frequency thereof, a demodulator of demodulating the processed digital image data signals to output processed analog image data signals, an image data processing means of further processing the processed analog image data signals, and a display means of diaplaying an image in accordance with the image data signals which are processed in the image data processing means.

In operation, observations are made in the satellite during a limited period, for instance, 30 ms in a predetermined period, for instance, 600 ms of rotating on its own axis to produce a series of digital image data signals, for instance, of data rate 14 Mbps. The digital image data signals are modulated in the modulator during the limited period of 30 ms, while the random signals produced in the PN code generator are modulated therein during the remaining period of 570 ms. The modulated signals of the image data signals and the random signals are converted in the up-converter to be of the radio frequency. Thereafter, the modulated signals are radiated by the antenna to the ground. In this occasion, the modulated signals are decreased in its power by a transmitting power decreasing means, if necessary.

The modulated signals are received in the ground center station by the antenna therein and converted in the down-converter to be of an original frequency. The modulated signals thus converted in regard to frequency are demodulated in the demodulator to be output as the analog image data signals which are to be processed in the image data processing means. The processed image data signals are stored temporalily into the memory after being digitized and read out thereof to be modulated in the modulator. The processed image data signals thus modulated are radiated from the ground center station to the satellite after being converted to be of a radio frequency, and are radiated again from the satellite to the ground. At the present operating stage of radiating the processed image data signals, image data signals to be processed are impossible to be transmitted from the satellite to the ground center station. On the other hand, the processed image data signals are not transmitted from the satellite to the ground data collecting stations when the image data signals to be processed are transmitted therefrom to the ground center station.

Thus, the processed image data signals are received in the ground data collecting stations wherein the processed image data signals are reconverted in the down-converter to be of the original frequency and demodulated in the demodulator. The processed image data signals thus demodulated are further processed in the image data processing means whereby an image is displayed on the display means in accordance with the further processed analog image data signals.

According to the apparatus of transmitting image data in a satellite system mentioned above, however, there can be found disadvantages as follows.

(1) The ground data collecting stations are impossible to collect the image data signals at the operating stage during which the image data signals to be processed are transmitted from the satellite to the ground center station. Therefore, the ground data collecting stations are placed under such an inconvenient situation for four hours a day in a case where the satellite station radiates image data signals to be processed to the ground center station eight times a day for the reason why the radiation takes approximately thirty minutes in each time.

(2) If the ground data collecting stations want to receive image data signals to be processed directly from the satellite so as to be processed therein, an antenna must be much larger for the reason why the image data signals to be processed are of such a high speed data rate as, for instance, 14 Mbps thereby resulting in the increase of facility cost.

(3) Transmitting power in the satellite is limited in its upper level to meet the requirement in regard to power flux density provided for in the Radio Regulation Act so that an antenna must be larger in the ground center station and data collecting stations, while a transmitting power decreasing means must be provided in the satellite.

(4) Even in a ground data collecting station provided on a ship, an antenna must be larger. In addition, it is necessary that a tracking means which is precisely operated is provided therein for the reason why a ship is pitched or rolled on the sea.

SUMMARY OF THE INVENTION

Accordingly, it is an object of the invention to provide a method and apparatus of transmitting image data in a satellite system in which image data to be processed and processed image data can be transmitted simultaneously from a satellite to the ground.

It is further object of the invention to provide a method and apparatus of transmitting image data in a satellite system in which an antenna is possible to be smaller in receiving image data to be processed and processed image data at a predetermined level on the ground.

It is a still further object of the invention to provide a method and apparatus of transmitting image data in a satellite system in which such parts as a PN code generator, a QPSK modulator, a transmitting power decreasing means are unnecessary to be provided in a satellite.

According to the invention, a method of transmitting image data in a satellite system comprises, the first step of transmitting image data signals of a predetermined data rate obtained by observations of a satellite and processed image data signals obtained in accordance with the processing of said image data signals in a ground center station simultaneously from satellite to the ground, said first step comprising decreasing said predetermined data rate of said image data signals down to another predetermined data rate, spreading a spectrum of said image data signals of a decreased data rate to a predetermined extent, combining spread spectrum image data signals of said decreased data rate and said processed image data signals, and radiating said image data signals to be processed and said processed image data signals thus combined, the second step of receiving said image data signals transmitted from said satellite at said ground center station and transmitting said processed image data signals back to said satellite, said second step comprising reproducing said image data signals of said decreased data rate in accordance with spread spectrum image data signals, producing said processed image data signals in accordance with reproduced image data signals, and encoding said processed image data signals with error correction code to be transmitted back to said satellite, and the third step of receiving said processed image data signals from said satellite at one of ground data collecting stations, said third step comprising decoding said processed image data signals which are encoded with said error correction code, and outputting image data to be utilized for display etc. in accordance with the further processing of said processed image data signals thus decoded.

According to the invention, further, an apparatus of transmitting image data in a satellite system comprises a satellite which comprises means for decreasing a data rate of image data signals to be processed, means for spreading a spectrum of said image data signals thus decreased in regard to data rate, means for combining said image data signals to be processed thus spread in regard to spectrum and processed image data signals which are received from the ground, and means for transmitting said image data signals to be processed and processed image data signals thus combined to the ground and receiving said processed image data signals from the ground, a ground center station which comprises means for receiving spread spectrum image data signals of a decreased data rate to be processed from said satellite and transmitting said processed image data signals, means for reproducing said image data signals of said decreased data rate, means for demodulating said image data signals to be processed thus reproduced to output analog image data signals, means for processing said analog image data signals to output said processed image data signals after being digitized, and means for encoding said processed image data signals in accordance with error correction code to be transmitted to said satellite, and ground data collecting stations each of which comprises means for receiving the combined image data signals from said satellite, means for decoding said processed image data signals which are encoded in accordance with said error correction code to output said processed image data signals of said decreased data rate, means for demodulating said processed image data signals thus decoded to output analog image data signals, and means for further processing said analog image data signals to be utilized for display etc.

Next, the advantages of the invention will be summarized before describing preferred embodiments thereof as follows.

(1) Image data signals to be processed and processed image data signals can be transmitted simultaneously from a satellite to the ground, while the image data signals to be processed and processed image data signals thus transmitted can be separated in accordance with a predetermined bit error rate in each of ground data collecting stations even if the both image data signals are of the same carrier frequency for the reason why the image data signals to be processed are decreased in regard to data rate and spread in regard to spectrum after digitized image data signals are produced in accordance with observations in the satellite, while the processed image data signals are transmitted to the satellite after being encoded with error correction code in a ground center station.

(2) In each of ground data collecting station, gain is increased in receiving the processed image data signals in accordance with an encoded gain thereof whereby an antenna becomes smaller for the reason why the processed image signals are encoded with error correction codes in the ground center station.

(3) Even image data signals to be processed can be easily received by a smaller antenna so that image data can be easily utilized even in the ground data collecting stations for the reason why the image data signals to be processed are decreased in regard to data rate.

(4) Processed image data signals are transmitted together with image data signals to be processed so that the time of distributing the processed image data signals is increased by approximately four hours a day as compared to the conventional method and apparatus as set forth in more detail later.

(5) An antenna becomes smaller so that tracking means on a ship etc. can be simplified.

(6) Image data signals are radiated from a satellite in the form of the spread of spectrum so that the image data signals are received on the ground to meet the requirement provided for in the Radio Regulation Act in regard to power flux density thereof. For the reason, a transmitting power decreasing means is unnecessary to be provided in a satellite so that the satellite can be light in its weight, small in its size, and increased in its reliability.

(7) An antenna can be smaller in a ground center station by one third as compared to that of the conventional method and apparatus so that facilities can be decreased in its cost.

BRIEF DESCRIPTION OF THE DRAWINGS

The invention will be explained in more detail in accordance with following drawings wherein, FIG. 1 is a block diagram showing a conventional apparatus of transmitting image data in a satellite system, FIG. 3A is a block diagram showing the first embodiment of an apparatus of transmitting image data in a satellite system according to the invention.

FIG. 6 is a block diagram showing the second embodiment of an apparatus of transmitting image data in a satellite system according to the invention.

DESCRIPTION OF THE PREFERRED EMBODIMENT

Figure 2A:
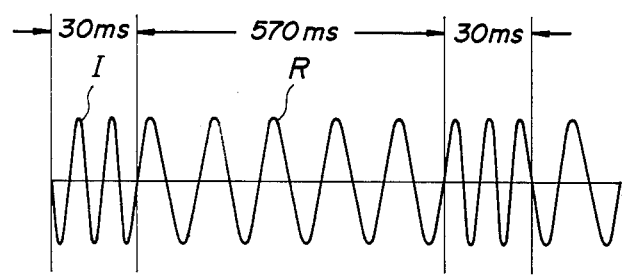
FIGS. 2A to 2D are a waveform of modulated image data and random signals, spectrum diagram thereof, a waveform of processed image data signals which are modulated, and spectrum diagram thereof respectively in the conventional apparatus of transmitting image data in a satellite system.

Before describing preferred embodiments according to the invention, a conventional apparatus of transmitting image data in a satellite system will be explained in more detail although it was briefly described before.

FIG. 1 shows the conventional apparatus of transmitting image data in a satellite system comprising a geostationary meteorological satellite (simply called "satellite" hereinafter) A, a ground center station B, and one of ground data collecting stations C. The satellite A comprises a digital image data circuit 11 of outputting image data signals which are digitized in accordance with analog image data signals produced from images taken by a camera therein, a PN code generator 12 of outputting random signals, a switch 13 of selecting the image data signals or random signals, a QPSK modulator 14 of quadrant-phase modulating the image data or random signals selected by the switch 13, a switch 15 of selecting the modulated signals from the QPSK modulator 14 or image data signals which are processed in the ground center station to be described later, an up-converter 16 of converting a frequency of the signals selected by the switch 15 into a radio frequency, a power amplifier 17 of amplifying the signals from the up-converter 16, a transmitting power decreasing circuit 19 which is, if necessary, to be inserted between switches 18 and 20, a diplexer 21 of changing over an operation of an antenna 25, a low noise amplifier 22 of amplifying the processed image data signals from the ground center station B, a down-converter 23 of converting a radio frequency of the processed image data signals into a predetermined frequency, and a band pass filter 24 of passing the processed image data signals therethrough. In addition, the ground center station B comprises an antenna 26 of receiving the image data to be processed and random signals radiated by the antenna 25 in the satellite A and from which the processed image data signals of a radio frequency are radiated, a diplexer 27 of changing over an operation of the antenna 26, a low noise amplifier 28 of amplifying the signals received by the antenna 26, a down-converter 29 of converting the carrier frequency of the received signals into a predetermined frequency, a band pass filter 30 of passing the received signals thus converted in regard to frequency therethrough, a demodulator 31 of demodulating the received signals to output analog image data signals, an image data processing means 32 in which the analog image data signals are processed, for instance, in regard to the reduction of noise therefrom, the compilation thereof and so on, a memory 33 of temporalily storing the processed image data signals after being digitized, a modulator 34 of modulating the image data signals read out of the memory 33, an up-converter 35 of converting the predetermined frequency of the processed image data signals into a radio frequency, and a power amplifier 36 of amplifying the processed image data signals thus modulated. Finally, each of the ground data collecting stations C comprises an antenna 37 of receiving the processed image data signals from the satellite A, a low noise amplifier 38 of amplifying the processed image data signals received by the antenna 37, a down-converter 39 of converting the carrier frequency of the processed image data signals into a predetermined frequency thereof, a band pass filter 40 of passing the reconverted frequency of the processed image data signals therethrough, a demodulator 41 of demodulating the processed image data signals to output analog image data signals, and an image data processing means in which the analog imaga data signals are processed to output image data to be utilized for a display means 43 and so on.

Figure 2B:
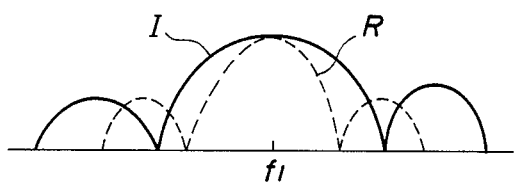

In operation, a series of digital image data signals are produced to be of a data rate, for instance, 14 Mbps in accordance with images taken for 30 ms by a camera in the satellite. The time of 30 ms is one twentieth the time of 600 ms during which the satellite rotates on its axis by one rotation. The digital image data signals are input from the digital image data circuit 11 through the switch 13 to the QPSK modulator 14 for 30 ms, while the random signals are input from the PN code generator 12 through the switch 13 to be changed over to the QPSK modulator 14 for the remaining 570 ms during one rotation time of the satellite A so that the digital image data signals and random signals are alternately quadrant-phase modulated therein to be produced as modulated signals. The modulated signals are input through the switch 15 to the up-converter 16 so that the image data signals and random signals of a carrier frequency are produced therein and amplified in the following power amplifier 17. The image data signals and random signals are next input through the transmitting power decreasing circuit 19, or directly, if the power thereof is below a predetermined level, to the diplexer 21 thereby being radiated by the antenna 25 to the ground. The waveform of the image data signals I and random signals R is shown in FIG. 2A, while the spectrum thereof is shown in FIG. 2B to have a relatively wide band at the center frequency $f_1$.

Figure 2C:
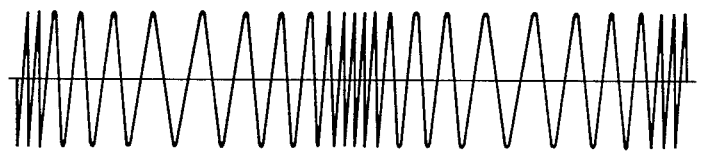
Figure 2D:
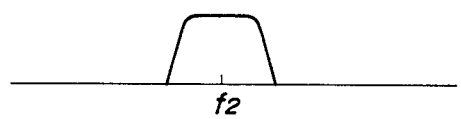

In the ground center station B, the signals which are transmitted from the satellite A are received by the antenna 26. The received signals are input through the diplexer 27 and low noise amplifier 28 to the down-converter 29 so that the received signals are converted to be of a predetermined frequency. The received signals thus converted in regard to frequency are demodulated in the demodulator 31 whereby analog image data signals are primarily produced to be processed in the following image data processing means 32. The image data signals thus processed therein are temporalily stored in the memory 33 after being digitized. The processed image data signals are periodically read out of the memory 33 to be modulated in regard to phase in the modulator 34 and then to be converted in the up-converter 35 as being of a radio frequency. The processed image data signals of the radio frequency are amplified in the amplifier 36 and then radiated through the diplexer 27 from the antenna 26. The transmitting wave from the antenna 26 is of Frequency Modulation-Amplitude Modulation wave or Frequency-Modulation-Frequency Modulation wave as shown in FIG. 2C, while the spectrum thereof has a band less than 1 MHz at the center frequency $f_2$ adjacent to the aforementioned frequency $f_1$ as shown in FIG. 2D.

Referring again to the satellite, the processed image data signals transmitted from the ground center station B are received by the antenna 25 and then input through the diplexer 21 and low noise amplifier 22 to the down-converter 23 in which the processed image data signals are converted as being of a predetermined frequency. The processed image data signals thus converted therein are passed through the band pass filter 24 and then input through the switch 15 to be changed over to the up-converter 16 in which the processed image data signals are converted to be of a radio frequency. The processed image data signals thus converted in regard to frequency are again transmitted from the antenna 25 in the same manner as described before. In this occasion, the image data signals of the center frequency $f_1$ to be processed and the processed image data signals of the center frequency $f_2$ are not transmitted simultaneously for the reason why the cetner frequencies $f_1$ and $f_2$ are adjacent to each other as described before.

In one of the ground data collecting stations C, the antenna 37 receives the processed image data signals from the satellite A whereby the received signals are amplified in the low noise filter 38 and then converted in the following down-converter 39 to be of a predetermined frequency. The processed image signals thus converted are input through the band pass filter 40 to the demodulator 41 in which analog image data signals are regenerated to be finally processed in the following image data processing means 42. The processed image data signals are input therefrom to the display means 43 whereby meteorological images will be displayed thereon.

Here, preferred embodiment of the invention will be described as follows.

In FIG. 3A, there is shown the first embodiment of a method and apparatus of transmitting image data in a satellite system wherein like parts are designated by like reference numerals and symbols in FIG. 1.

In the satellite A, there are provided a data rate decreasing circuit 50 of decreasing a data rate of the digital image data signals from the digital image data circuit 11 in place of the PN code generator 12 and the switch 13 in FIG. 1, a spread spectrum transmitting means 51 of spreading a spectrum of the digital image data signals of a decreased data rate in place of the QPSK modulator 14 therein, and a combining circuit 52 of combining the image data signals of the decreased data rate spread in regard to spectrum and image data signals processed in the ground center station B in place of the switch 15 therein respectively. On the other hand, the satellite A does not comprises the switches 18 and 20 and the transmitting power decreasing circuit 19 which are provided in FIG. 1.

In the ground center station B, there is provided a spread spectrum receiving means 53 of outputting the image data signals of the decreased data rate and a demodulator 54 of demodulating the image data signals of the decreased data rate to output analog image data signals in place of the demodulator 31 in FIG. 1. There is further provided an error correction encoder 55 of encoding the image data signals processed in the image data processing means 32 at the front stage of the modulator 34 therein.

In regard to the spread spectrum transmitting means 51 and spread spectrum receiving means 53, relevant explanations are made in the chapter 7 "Radio Frequency Circuit" on pages 216 to 242 in "Spread Spectrum System" the author of which is R.C. Dixon published in 1976 by John Wiley & Sons. In regard to the error correction encoder 55, further, detailed explanations are made in "Digital Communications by Satellite" the author of which are V. K. Bhargava et al. published in 1981 also by John Wiley & Sons.

In each of the ground data collecting stations C, there are further provided a spread spectrum receiving means 57, a decoder 58 of decoding the processed image data signals encoded with the error correction code, and switches 56 and 59 of selecting the spread spectrum receiving means 57 or the decoder 58.

In regard to the spread spectrum receiving means 57 and decoder 58, the former and latter literature materials as mentioned before can be available respectively.

Figure 3B:
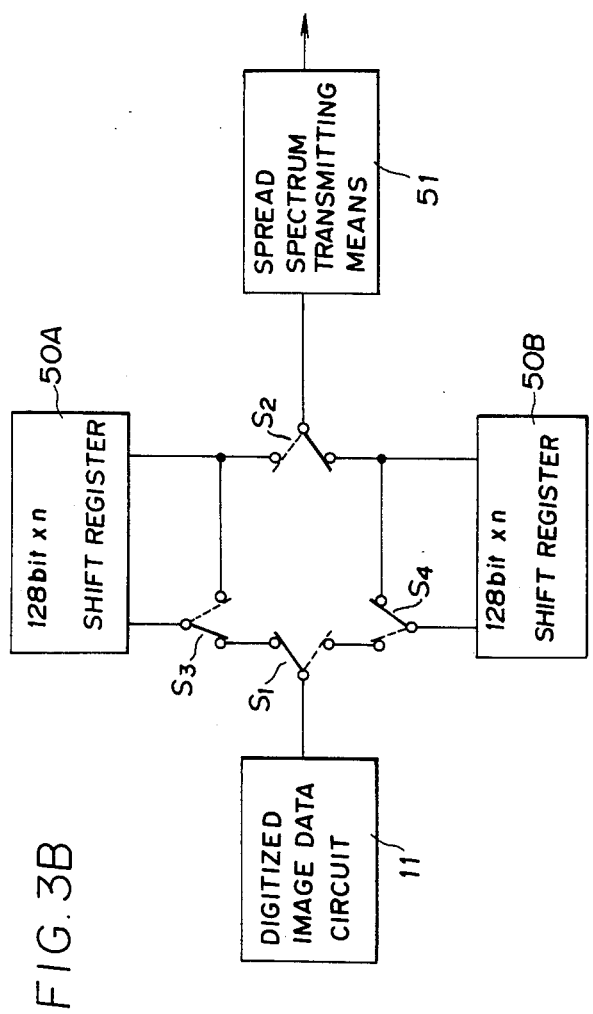
FIG. 3B is a block diagram showing a data rate decreasing circuit in FIG. 3A.

FIG. 3B shows the data rate decreasing circuit 50 which comprises shift registers 50A and 50B each of $128 \times n$ and switches $S_1$ to $S_4$ each taking solid and dotted lines positions respectively.

Figure 4:
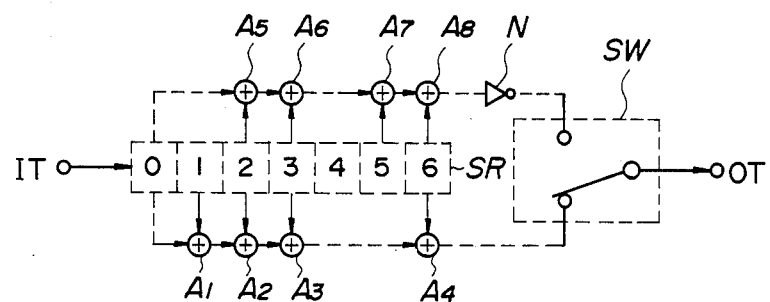
FIG. 4 is an explanatory diagram showing an error correction encoder in the first embodiment in FIG. 3, FIG. 5A to 5E are an explanatory diagram showing the spread spectrum of image data signals of a decreased data rate which are to be processed, input data to the error correction encoder, output data therefrom, a waveform showing image data signals to be processed and processed image data signals having error correction code which are modulated to be transmitted simultaneously, and a spectrum diagram thereof respectively in the first embodiment in FIG. 3A.

FIG. 4 shows an example of the error correction encoder 55 provided in the ground center station B which comprises a shift register SR of seven bits having an input terminal IT, eight adders $A_1$ to $A_8$ each adding contents of two bits of the shift register SR designated by dotted arrows, and inverter N of inverting output of the adder $A_8$, and a switch SW having an output terminal OT of outputting the outputs of the adder $A_4$ and inverter N separately, that is, respective signals which will be a series of two bits in each clock during which signal of one bit is input through the input terminal IT to the shift register SR.

Figure 5A:
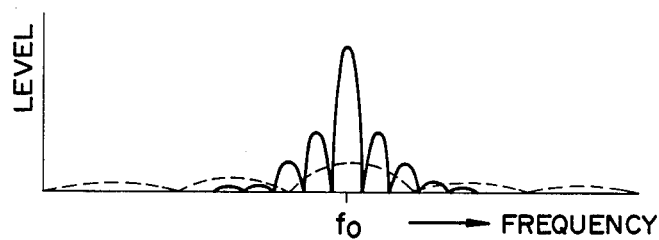

In operation, a series of digital image data signals a data rate of which is, for instance, 14 Mbps are input from the digital image data circuit 11 to the data rate decreasing circuit 50 for 30 ms in 600 ms of a rotation period of the satellite A. In the data rate decreasing circuit 50, the switches S₁ to S₄ are on the position indicated by the solid line as shown in FIG. 3B so that the image data signals of 14 Mbps are input through the switches S₁ and S₃ into the shift register 50A, while the image data signals formerly stored in the shift register 50B are read out through the switch S₂ therefrom in accordance with clock signals of 0.7 Mbps for the above mentioned 600 ms. Next, the switches S₁ to S₄ are turned on the position indicated by the dotted line so that the image data signals of 14 Mbps are input through the switches S₁ and S₄ into the shift register 50B, while the image data signals in the shift register 50A are read out through the switch S₂ therefrom in accordance with clock signals of 0.7 Mbps for 600 ms. The operation of inputting and outputting the image data signals as mentioned above is alternately repeated. Therefore, the data rate thereof is decreased down to 0.7 Mbps, that is, one twentieth the original data rate 14 Mbps. The image data signals of the decreased data rate the spectrum of which is shown by a solid curve in FIG. 5A are input to the spread spectrum transmitting means 51 so that the image data signals are spread in regard to spectrum as shown by a dotted curve in FIG. 5A thereby being easier to meet the requirement of power flux density without such a transmitting power decreasing means as mentioned before. At the same time, the image data signals are quadrant-phase modulated in the spread spectrum transmitting means 51. The image data signals of the decreased data rate thus spread in regard to spectrum are combined with image data signals processed in the ground center station B which are passed through the band pass filter 24. The combined image data signals are converted in the up-converter 16 to be of a radio frequency and then amplified in the power amplifier 17. The amplified image data signals are supplied through the diplexer 21 to the antenna 25 and radiate therefrom.

Figure 5B:
Figure 5C:

The image data signals transmitted from the satellite A are received by the antenna 26 in the ground center station B and supplied through the diplexer 27 to the low noise amplifier 28, and the amplified image data signals are converted in the down converter 29 to be of an original predetermined frequency and supplied through the band pass filter 30 to the spread spectrum receiving means 53 in which the image data signals of the decreased data rate are reproduced. The image data signals thus reproduced are demodulated in the demodulator 54 to be output in the form of analog signals to the image data processing means 32. The image data signals processed therein are input directly to the error correction encoder 55, or stored temporalily in the memory 33 and then read out of the memory 33 periodically to be supplied to the error correction encoder 55. In the error correction encoder 55 as shown in FIG. 4, the processed image data signals are encoded with convolution code the constraint length and encoding rate of which are 7 and ½ respectively. The image data signals prior to the encoding with error correction code are illustrated in FIG. 5B, while the image data signals after being encoded with error correction code are illustrated in FIG. 5C. The encoded image data signals are converted in the up-converter 35 to be of a carrier frequency and then amplified in the power amplifier 36. The processed image data signals thus amplified are supplied through the diplexer 27 to the antenna 26 and then radiated thereby to the satellite A.

Figure 5D:
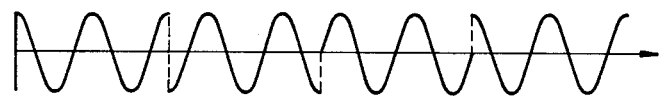
Figure 5E:
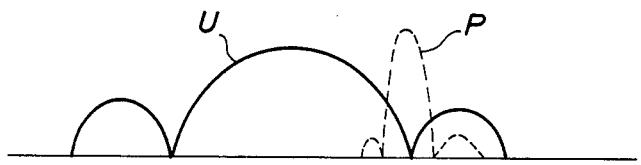

The processed image date signals received by the antenna 25 in the satellite A are supplied through the diplexer 21 to the low noise amplifier 22 and then input through the down-converter 23 and band pass filter 24 to the combining circuit 52 in which the processed imaged data signals are combined with the imaged data signals to be processed from the spread spectrum transmitting means 51 whereby the combined image data signals radiate from the antenna 25 as described before. FIG. 5D shows a modulated wave where the image data signals to be processed and the processed image data signals encoded with error correction code are transmitted simultaneously from the satellite A to the ground, while FIG. 5E shows the spectrums U and P respectively for the spread spectrum image data signals which have not been processed yet and the processed image data signals. As clearly understood from the illustration in FIG. 5E, carrier frequencies thereof are appropriately spaced from each other. In addition, the transmission of the processed image data signals can be periodically conducted from the ground center station B to the satellite A in a case where the procussed image data signals are temporalily stored in the memory 33 of the ground center station B.

In one of the ground data collecting stations C, the processed image data signals can be received in the event that the switches 56 and 59 are turned on the side of the decoder 58. In such a case, the processed image data signals received by the antenna 37 are supplied through the low noise amplifier 38, down-converter 39, and band pass filter 40 to the decoder 58 so that the processed image data signals which are previously encoded with error correction code are decoded to output digital image data signals to the demodulator 60. The digital image data signals are demodulated therein to be output as analog image data signals to the image data processing means 42. In the image data processing means 42, the image data signals are processed whereby meteorological images are displayed on the display means 43. In receiving the transmitting signals from the satellite A, the receiving gain is highly improved in accordance with encoded gain for the reason why the processed image data signals are received therein in the form of signals encoded with error correction code.

On the other hand, the image data signals to be processed can be received therein in the event that the switches 56 and 57 are turned on the side of the spread spectrum receiving means 59 in which the image data signals of the decreased data rate to be processed are reproduced to be output to the demodulator 60. The operation to be followed hereinafter is the same as described in the operation in receiving the processed image data signals.

Next, there will be explained the reason why image data signals to be processed and processed image data signals received from a ground center station can be transmitted simultaneously from a satellite to the ground without any interference as follows.

At first, it is assumed that transmitting powers for both image data signals to be processed and processed image data signals are equal in level to each other in a case where the both signals are transmitted simultaneously. Under this condition, interference tolerance Mj is 0 dB for the both signals.

Secondly, it is assumed that S/N ratio which is required for achieving bit error rate of $10^{-5}$ is 10 dB. Under this condition, a gain Gp which is necessary for performing the spread of spectrum is expressed in the following equation.

$$G_p = M_j + [L_{sys} + \text{S/N ratio to be required}],$$

where $L_{sys}$ is the loss in the subject system.

In the above equation, the gain $G_p$ is necessary to be 11 dB if $L_{sys}$ is assumed to be 1 dB.

The maximum data rate R of the image data signals to be processed are expressed in the following equation.

$$R = B_{WRF}/G_p,$$

where $B_{WRF}$ is a bandwidth of radio frequency after the image data signals to be processed are spread in regard to spectrum.

In the above equation, the image data signals to be processed can be transmitted up to R(=0.79 Mbps) if $B_{WRF}$ is assumed to be 10 MHz.

In the first embodiment described before, therefore, the image data signals to be processed are decreased in regard to data rate from 14 Mbps down to 0.7 Mbps, that is, one twentieth the original data rate.

On the other hand, S/N ratio which is required for achieving bit error rate $10^{-5}$ is approximately 5 dB for the processed image data signals if it is assumed that the processed image data signals are encoded with error correction code.

Accordingly, S/N ratio more than 5 dB which can achieve bit error rate $10^{-5}$ sufficiently for the processed image data signals is obtained if a carrier frequency of the processed image data signals is at the first null point of a spectrum of the image data signals to be processed which are spread in regard to spectrum when the processed image data signals are received on the ground whereby the image data signals to be processed and processed image data signals can be transmitted simultaneously in accordnace with frequency division thereof as shown in FIG. 5E.

In FIG. 6, there is shown the second embodiment of a method and apparatus of transmitting image data in a satellite system wherein like parts are indicated by like reference numerals and symbols in the first embodiment. Although the satellite A is of the same structure as that of the first embodiment, the ground center station B and each of the ground data collecting stations C are different therefrom respectively in that the ground center station B further comprises a spread spectrum transmitting means 61 positioned between the error correction encoder 55 and the up converter 35, while each of the ground data collecting stations C is structured such that the decoder 58 is connected in series with the spread spectrum receiving means 57 and demodulator 60 in accordance with the turning of a switch 62 on the side of the decoder 58.

In operation, the satellite A, the ground center station B, and each of the ground data collecting stations C operate in the same manner as in the first embodiment except that the processed image data signals which are encoded in the error correction encoder 55 are spread in regard to spectrum in the spread spectrum transmitting means 61 and then output to the up-converter 35 therefrom in the ground center station B, and the processed image data signals of the decreased data rate are reproduced in the decoder 58 in one of ground data collecting stations C when the switch 62 is turned on the side of the decoder 58, while the image data signals to be processed are input from the spread spectrum receiving means 57 to the demodulator 60 therein when the switch 62 is turned on the side of the demodulator 60.

Figure 7:
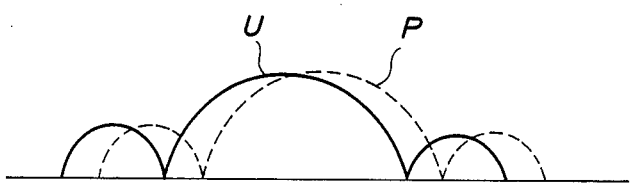
FIG. 7 is a spectrum diagram of image data signals of a spread spectrum to be processed and processed image data signals having error correction codes in the second embodiment in FIG. 6.

FIG. 7 shows spectrums for the image data signals U to be processed and the processed image data signals P which are encoded with error correction codes.

In the second embodiment, especially, the image data signals to be processed and processed image data signals can be transmitted simultaneously even if the carrier frequencies thereof are the same as each other for the reason why the image data signals to be processed are decreased in regard to data rate and then spread in regard to spectrum in the satellite to be transmitted therefrom, while the processed image data signals are encoded with error correction code and then spread in regard to spectrum in the ground center station B to be transmitted therefrom. Further, image data signals to be processed can be received in one of ground data collecting stations even if the station is provided only with a small antenna for reason why the signals are decreased in regard to data rate.

Although the invention has been described with respect to specific embodiments for complete and clear disclosure, the apended claims are not to thus limited but are to be construed as embodying all modification and alternative constructions that may occur to one skilled in the art which fairly fall within the basic teaching herein set forth.

What is claimed is:

1. A method of transmitting image data in a satellite system comprising, the first step of transmitting image data signals of a predetermined data rate produced by observations in a satellite and processed image data signals obtained in accordance with the processing of said image data signal in a ground center station simultaneously from said satellite to the ground, said first step comprising decreasing said predetermined data rate of said image data signals down to another predetermined data rate, spreading a spectrum of said image data signals of a decreased data rate, receiving said processed image data signals from said ground center station, combining spread spectrum image data signals of said decreased data rate and said processed image data signals, and radiating said image data signals to be processed and said processed image data signals thus combined, the second step of receiving said image data signals to be processed which are transmitted from said satellite at said groud center station and transmitting said processed image data signals back to said satellite, said second step comprising reproducing said image data signals of said decreased data rate in accordance with spread spectrum image data signals, producing said processed image data signals in accordance with reproduced image data signals, and encoding said processed image data signals with error correction code to be transmitted back to said satellite, and the third step of receiving said processed image data signals from said satellite at one of ground data collecting stations, said third step comprising decoding said processed image data signals which are encoded with said error correction code, and outputting image data to be utilized for display etc. in accordance with the further processing of said processed image data signals thus decoded.

2. A method of transmitting image data in a satellite system according to claim 1, wherein said second step further comprises spreading a spectrum of said processed image data signals encoded with said error correction code, and said third step further comprises receiving said processed image data signals encoded with said error correction code which are thus spread in regard to spectrum in said ground center station.

3. A method of transmitting image data in a satellite system comprising, the first step of transmitting image data signals of a predetermined data rate produced by observations of a satellite and processed image data signals obtained in accordance with the processing of said image data signal in a ground center station simultaneously from said satellite to the ground, said first step comprising decreasing said predetermined data rate of said image data signals down to another predetermined data rate, spreading a spectrum of said image data signals of a decreased data rate, receiving said processed image data signals from said ground center station, combining spread spectrum image data signals of said decreased data rate and said processed image data signals, and radiating said image data signals to be processed and said processed image data signals thus combined, the second step of receiving said image data signals to be processed which are transmitted from said satellite at said ground center station and transmitting said processed image data signals back to said satellite, said second step comprising reproducing said image data signals of said decreased data rate in accordance with spread spectrum image data signals, producing said processed image data signals in accordance with reproduced image data signals, and encoding said processed image data signals with error correction code to be transmitted back to said satellite, and the third step of receiving said image data signals to be processed from said satellite at one of ground data collecting stations, said third step comprising processing said image data signals to be processed to output processed image data signals therein.

4. An apparatus of transmitting image data in a satellite system comprising, a satellite which comprises means for decreasing a data rate of image data signals to be processed, means for spreading a spectrum of said image data signals thus decreased in regard to data rate, means for combining said image data signals to be processed thus spread in regard to spectrum and processed image data signals which are received from the ground, and means for transmitting said image data signals to be processed and processed image data signals thus combined to the ground and receiving said processed image data signals from the ground, a ground center station which comprises means for receiving spread spectrum image data signals of a decreased data rate to be processed from said satellite and transmitting said processed image data signal, means for reproducing said image data signals of said decreased data rate, means for demodulating said image data signals to be processed thus reproduced to output analog image data signals, means for processing said analog image data signals to output said processed image data signals after being digitized, and means for encoding said processed image data signals in accordance with error correction code to be transmitted to said satellite, and ground data collecting stations each of which comprises means for receiving the combined image data signals from said satellite, means for decoding said processed image data signals which are encoded in accordance with said error correction code to output said processed image data signals of said decreased data rate, means for demodulating said processed image data signals thus decoded to output analog image data signals, and means for further processing said analog image data signals to be utilized for display etc.

5. An apparatus of transmitting image data in a satellite system according to claim 4, wherein said ground center station further comprises a spread spectrum transmitting means for said processed image data signals which are encoded therein, and each of said ground data collecting stations further comprises a spread spectrum receiving means.

6. An apparatus of transmitting image data in a satellite system comprising a satellite which comprises means for decreasing a data rate of image data signals to be processed, means for spreading a spectrum of said image data signals thus decreased in regard to data rate, means for combining said image data signals to be processed thus spread in regard to spectrum and processed image data signals which are received from the ground, and means for transmitting said image data signals to be processed and processed image data signals thus combined to the ground and receiving said processed image data signals from the ground, a ground center station which comprises means for receiving spread spectrum image data signals of a decreased data rate to be processed from said satellite and transmitting said processed image data signals, means for reproducing said image data signals of said decreased data rate, means for demodulating said image data signals to be processed thus reproduced to output analog image data signals, means for processing said analog image data signals to output said processed image data signals after being digitized, and means for encoding said processed image data signals in accordance with error correction code to be transmitted to said satellite, and ground data collecting stations each of which comprises means for receiving the combined image data signals from said satellite, means for reproducing image data signals to be processed of said decreased data rate, means for demodulating said image data signals to be processed to output analog image data signals to be processed, and means for processing said analog image data signals.

* * * * *